United States Patent
Foster et al.

(10) Patent No.: US 8,173,015 B2
(45) Date of Patent: May 8, 2012

(54) PHOTOCATALYTIC REACTOR

(75) Inventors: Neil Robert Foster, Aberdeenshire (GB); Kourosh Bassiti, Virollet (FR)

(73) Assignee: UVPS Environmental Solutions Limited, Aberdeen (GB)

( * ) Notice: Subject to any disclaimer, the term of this patent is extended or adjusted under 35 U.S.C. 154(b) by 410 days.

(21) Appl. No.: 12/447,110

(22) PCT Filed: Oct. 25, 2007

(86) PCT No.: PCT/GB2007/004059
§ 371 (c)(1),
(2), (4) Date: Apr. 24, 2009

(87) PCT Pub. No.: WO2008/050119
PCT Pub. Date: May 2, 2008

(65) Prior Publication Data
US 2010/0003169 A1 Jan. 7, 2010

(30) Foreign Application Priority Data
Oct. 25, 2006 (GB) .................................. 0621246.8

(51) Int. Cl.
*C02F 1/32* (2006.01)
*C02F 1/74* (2006.01)

(52) U.S. Cl. ........ 210/220; 210/258; 422/140; 422/142; 422/186; 422/186.3

(58) Field of Classification Search ............... 210/748.1, 210/748.11, 748.12, 748.13, 748.14, 748.15, 210/758, 763, 764, 200, 201, 205, 220, 258; 422/140, 141, 142, 186, 186.3, 218, 239; 261/121.1, 123, 126
See application file for complete search history.

(56) References Cited

U.S. PATENT DOCUMENTS
5,909,613 A * 6/1999 Miyoshi et al. ............... 422/186

FOREIGN PATENT DOCUMENTS

| CN | 1 508 073 | 6/2004 |
|---|---|---|
| JP | 10085736 A * | 4/1998 |
| JP | 10-244256 | 9/1998 |
| JP | 2002-177973 | 6/2002 |
| JP | 2004-188333 | 7/2004 |
| KR | 2003 0083972 | 11/2003 |
| WO | WO 03/014030 | 2/2003 |

OTHER PUBLICATIONS

Machine translation of JP 10085736 A (1998) (obtained from JPO 7-11).*
Machine translation of CN 1508073 A (2004) (obtained 7-11).*
International Search Report for PCT/GB2007/004059, mailed Feb. 4, 2008.
Derwent Publications Ltd., Database WPI Week 200462, Accession No. 2004-636244, & CN 1 508 073, (Jun. 30, 2004).

* cited by examiner

*Primary Examiner* — Nam Nguyen
*Assistant Examiner* — Lucas Stelling
(74) *Attorney, Agent, or Firm* — Nixon & Vanderhye P.C.

(57) ABSTRACT

A photocatalytic reactor for carrying out a photocatalytic reaction on a liquid which is to be treated, the reactor comprising a reaction chamber which comprises: (i) a foraminated member which supports a plurality of mobile photocatalyst particles, the size and density of which is such that they tend to rest on the foraminated member in use; and (ii) an aeration device which causes gas bubbles to rise from the foraminated member and agitate the mobile photocatalyst particles. The reactor may be a flow-through reactor. The photocatalytic reactor can be applied to the remediation of waste water using titanium oxide.

13 Claims, 3 Drawing Sheets

PHOTOCATALYTIC REACTOR

This application is the U.S. national phase of International Application No. PCT/GB2007/004059 filed 25 Oct. 2007, which designated the U.S. and claims priority to Great Britain Application No. 0621246.8 filed 25 Oct. 2006, the entire contents of each of which are hereby incorporated by reference.

FIELD OF THE INVENTION

The invention relates to a photocatalytic reactor for carrying out a photocatalysed chemical reaction in a liquid medium.

BACKGROUND TO THE INVENTION

Issues concerning the invention will be illustrated with reference to the treatment of water to break down hydrocarbons and other organic pollutants by photocatalysis using titanium dioxide in a flow-through reactor. However, the invention can also be applied to batch and flow-through reactors for carrying out other photocatalysed chemical reactions in liquid media.

It is known to treat water, such as industrial and domestic effluent, or a fresh water supply, to remove hydrocarbons and organic compounds using titanium dioxide photocatalysis. Titanium dioxide is favoured because it is inexpensive, non-toxic, chemically stable and has a high photocatalytic activity. Titanium dioxide absorbs photons with an energy of less than or equal to its band gap energy (i.e. a wavelength of up to 388 nm in the case of anatase phase titanium dioxide) promoting a valence band electron to the conduction band. The resulting holes oxidise water to form reactive hydroxyl radicals or directly oxidise organic molecules adsorbed to the surface. The corresponding electrons reduce oxygen which is present to reactive superoxide anions. Thus, effective remediation of waste water by titanium dioxide photocatalysis requires the presence of oxygen.

One method of carrying out photocatalytic reactions is to pack photocatalyst solidly into a column through which a liquid which is to be treated flows. A water purifying unit of this type is disclosed in JP 2001-253430A (Kiyonori). However, this is not an effective use of catalyst as the transmission of light through a solidly packed column will be poor.

Another method of carrying out photocatalytic reactions is to form a layer of catalyst on the interior surface of a tube through which the liquid which is to be treated flows, or on the surface of a plate across which the liquid which is to be treated flows. In these configurations, light can be effectively transmitted to the surface of the catalyst. However, the overall effectiveness of the catalysis is limited by mass transport and the diffusion of molecules within the liquid to the catalytic surfaces.

Another method of carrying out photocatalytic reactions is to distribute fine photocatalyst particles in a reaction chamber where they float in a substantially uniform fashion. Fine photocatalyst particles will generally have a high surface area to volume ratio which would be expected to aid photocatalysis. However, light transmission can be poor as such particles will have a high cross-section to volume ratio. If the catalyst is sufficiently fine to be distributed in a substantially uniform fashion throughout the reaction chamber, it will be difficult to separate. When used in a batch mode, the catalyst may take weeks to settle once the reaction has been completed. When used in a flow-through mode, it can be very difficult to filter the catalyst from the outflow and the particles will flow, with the liquid which is to be treated, into the outlet filters.

International patent application publication number WO 2005/033016 (Robertson et al.) discloses apparatus for the remediation of water using titanium dioxide photocatalysis including a container within which the photocatalysed reaction takes place and means to move the container. The use of titanium dioxide pellets with a mean grain size of 0.1 to 50 mm is disclosed. Thus, the apparatus disclosed in this application enables the effective use of mobile photocatalyst particles of a sufficiently large size to enable them to be conveniently separated from the liquid which is to be treated, without mass transport limitations. This apparatus is effective, but the use of moving parts could limit its usefulness in some applications.

It would be desirable to provide a photocatalytic reactor which uses mobile photocatalyst particles of a sufficiently large size to enable them to be conveniently separated from the liquid which is to be treated, and which minimizes mass transport limitations, but does not require moving parts, or minimizes the use of moving parts.

SUMMARY OF THE INVENTION

According to a first aspect of the present invention there is provided a photocatalytic reactor for carrying out a photocatalytic reaction on a liquid which is to be treated, the reactor comprising a reaction chamber which comprises: (i) a foraminated member which supports a plurality of mobile photocatalyst particles, the size and density of which is such that they tend to rest on the foraminated member in use; and (ii) an aeration device which causes gas bubbles to rise from the foraminated member and agitate the mobile photocatalyst particles.

The use of gas bubbles to agitate the mobile photocatalyst particles reduces or removes the need for moving parts, whilst allowing the use of photocatalyst particles, the size and density of which is such that they tend to rest on the foraminated member in use. By mobile, we mean that the photocatalyst particles can be moved by the gas bubbles. Some may rest on the foraminated member for a period of time. As the photocatalyst particles are mobile, they can tumble and present different faces to a light source in response to agitation. The agitation of the photocatalyst particles may improve mass transport of molecules in the liquid which is to be treated to the surface of the photocatalyst particles.

In order to tend to rest on the foraminated member in use, the size and density of the photocatalyst particles should be selected such that terminal settling velocity of the photocatalyst particles exceeds the velocity of any upwards flow of the liquid through the foraminated member.

Preferably, the terminal settling velocity of the photocatalyst particles may exceed the velocity of any upwards flow of the liquid through the foraminated member by at least 0.1 ms$^{-1}$, more preferably at least 0.5 ms$^{-1}$. Typically, the terminal settling velocity of the photocatalyst particles will not exceed the velocity of any upwards flow of the liquid through the foraminated member by more than 10 ms$^{-1}$. Thus, the size and density of suitable photocatalyst particles depends to some extent on the density of the liquid which is to be treated and the velocity of any upwards flow of the liquid through the foraminated member.

Thus, the reactor may be a batch reactor in which case the velocity of the upwards flow of the liquid through the foraminated member is zero. The reactor may be a batch reactor in which a sample is passed vertically upwards through the foraminated member repetitively. Preferably, the reactor is a flow-through reactor in which the liquid flows in an upwards directions through the foraminated member.

At one extreme, all, or the substantial majority, of the photocatalyst particles rest on the foraminated member or other photocatalyst particles at any given moment. However, at the other extreme, the terminal settling velocity of the photocatalyst particles, the velocity of upwards flow of the liquid through the foraminated members (in the case of a flow-through reactor), and the amount and size of the gas bubbles may be selected so that the majority of the photocatalyst particles are not resting on the foraminated member or other photocatalyst particles at any give moment, with only a small proportion of the photocatalyst particles resting on the foraminated member at any given moment.

The gas bubbles may comprise a gas which is a substrate for a reaction catalysed by the photocatalyst particles. Within this description and the appended claims, the term "aeration device" refers to a device, such as a diffuser, which creates gas bubbles and is not limited to a device which creates air bubbles. Nevertheless, the gas bubbles may be air bubbles. The photocatalytic reaction may be a photocatalytic reaction in which the photocatalyst particles catalyse a reaction involving oxygen from the air bubbles. In such circumstances, the use of air bubbles may help to maintain the dissolved oxygen concentration at the surface of the mobile photocatalyst particles, potentially increasing the overall activity of the photocatalyst particles.

The aeration device may comprise a diffuser including the foraminated member such that gas is forced through the foraminated member, creating gas bubbles. However, preferably, the aeration device is located below the foraminated member and gas bubbles rise through the liquid which is to be treated to the foraminated member.

We have found that, in this configuration, some air bubbles typically combine underneath the foraminated member meaning that a proportion of the air bubbles which rise from the foraminated member have a diameter which is greater than the diameter of the air bubbles which rose through liquid to the foraminated member. We have found that this helps to agitate the photocatalyst particles.

Preferably, at least some of the gas bubbles which rise from the foraminated member and photocatalyst particles in contact with the foraminated member have a diameter which is at least double the maximum diameter of the gas bubbles which rise through the liquid which is to be treated to the foraminated member. More preferably, at least some of the gas bubbles which rise from the foraminated member and photocatalyst particles in contact with the foraminated member have a diameter which is at least five times the maximum diameter of the gas bubbles which rise through the liquid which is to be treated to the foraminated member.

Preferably, the foraminated member comprises a horizontal portion which supports the plurality of photocatalyst particles. In a flow-through reactor, the liquid which is to be treated typically passes upwards through the horizontal portion of the foraminated member.

Within this description and the appended claims, the term "foraminated member" refers to a member comprising a plurality of holes which extend through the member. The foraminated member preferably comprises holes with a width of at least 0.3 mm, more preferably 1 to 5 mm. The foraminated member may comprise circular holes.

The size of the photocatalyst particles should be selected such that they cannot pass through the holes in the foraminated member. The average diameter of the gas bubbles created by the aeration device is typically less than the minimum dimension of the holes in the foraminated member. The average diameter of the gas bubbles created by the aeration device is typically less than 3 mm, preferably around 1 mm.

The reaction chamber may comprise a plurality of baskets, each of which has a base which comprises a foraminated member, supporting a plurality of mobile photocatalyst particles which tend to rest on the foraminated member in use and from which gas bubbles rise and agitate the plurality of mobile photocatalyst particles. The baskets will typically be open topped, although the baskets may be closed at the top by a foraminated member through which gas bubbles rise in use. In a flow-through reactor, the liquid will typically flow in an upwards direction through each foraminated member.

The reaction chamber may be divided by foraminated members into a plurality of chambers located above each other, each of which has a base which comprises a foraminated member supporting a plurality of mobile photocatalyst particles which tend to rest on the foraminated member in use and from which gas bubbles rise and agitate the plurality of mobile photocatalyst particles. In a flow-through reactor, the liquid will typically flow in an upwards direction through each foraminated member.

By dividing the catalytic particles into separate groups, supported by different foraminated members, the overall efficiency of the photocatalysed process for a given amount of photocatalyst can be increased. Preferably, gas bubbles rise from each foraminated member (apart from the top foraminated member) and catalyst particles resting thereon, to the underside of the foraminated member above through the liquid. Thus, air bubbles may combine under each foraminated member.

The reaction chamber preferably comprises a light source which emits light that is received by the photocatalyst particles and is of a catalytic frequency. The reaction chamber may comprise light permeable walls or light conducting conduits for receiving light of a catalytic frequency from a light source which is external to the chamber. The catalytic frequency depends on the photocatalyst. Where the photocatalyst particles are anatase phase titanium dioxide, the catalytic frequency is up to 388 nm.

The light source may comprise a fluorescent tube (e.g. a UV fluorescent tube). The fluorescent tube may be vertical. The foraminated members may comprise an aperture through which the light source (e.g. a fluorescent tube) passes. The light source may be located within a transparent tube, for example a glass tube, which extends vertically through apertures in the one or more foraminated members. The light source may be horizontal, for example, the light source may comprise one or more horizontal fluorescent tubes. One or more horizontal light source may be provided between each successive foraminated member. A separate light source may be located within each chamber. Where there are a plurality of baskets or chambers this can increase the amount of light which is incident on the photocatalyst particles.

The photocatalyst particles may be semiconductor particles. The photocatalyst particles may be titanium dioxide. Preferably, the photocatalyst particles are anatase phase titanium dioxide. The photocatalyst particles may have a mean maximum dimension of 0.1 to 50 mm. Preferably, the photocatalyst particles have a minor dimension of at least 0.5 mm and not more than 10 mm. Preferably, the photocatalyst particles have a major dimension of at least 0.5 mm and not more than 20 mm.

The photocatalyst particles may be moulded bodies of titanium dioxide with a mean grain size $d_{50}$ of 0.01 to 50 mm, that are composed in each case of primary crystallites of anatase phase titanium dioxide with a crystallite size according to Scherrer of up to 40 nm and that have a specific surface determined according to the BET method of 20 to 150 m$^2$/g, a pore volume of 0.1 to 0.45 cm$^3$/g, and a pore diameter of 100 to 300 Å.

The liquid which is to be treated is typically aqueous. The liquid which is to be treated may be waste water which is to be treated to remove organic pollutants. The liquid which is to be treated may be drinking water:

The reaction chamber may comprise an inlet for receiving the liquid which is to be treated and an outlet, wherein the outlet is located above the inlet and the liquid flows generally upwards from the inlet to the outlet through the one or more foraminated members. The reaction chamber may extend above the outlet and may comprise a gas bleed member, such as a valve, through which gas introduced by the aeration device can be removed. The aeration device may comprise a gas receiving volume and a diffuser surface, located below the inlet, through which the gas passes and is broken down into bubbles.

DESCRIPTION OF THE DRAWINGS

Example embodiments of the present invention will now be illustrated with reference to the following Figures in which.

DETAILED DESCRIPTION OF AN EXAMPLE EMBODIMENT

Example 1

Figure 1:
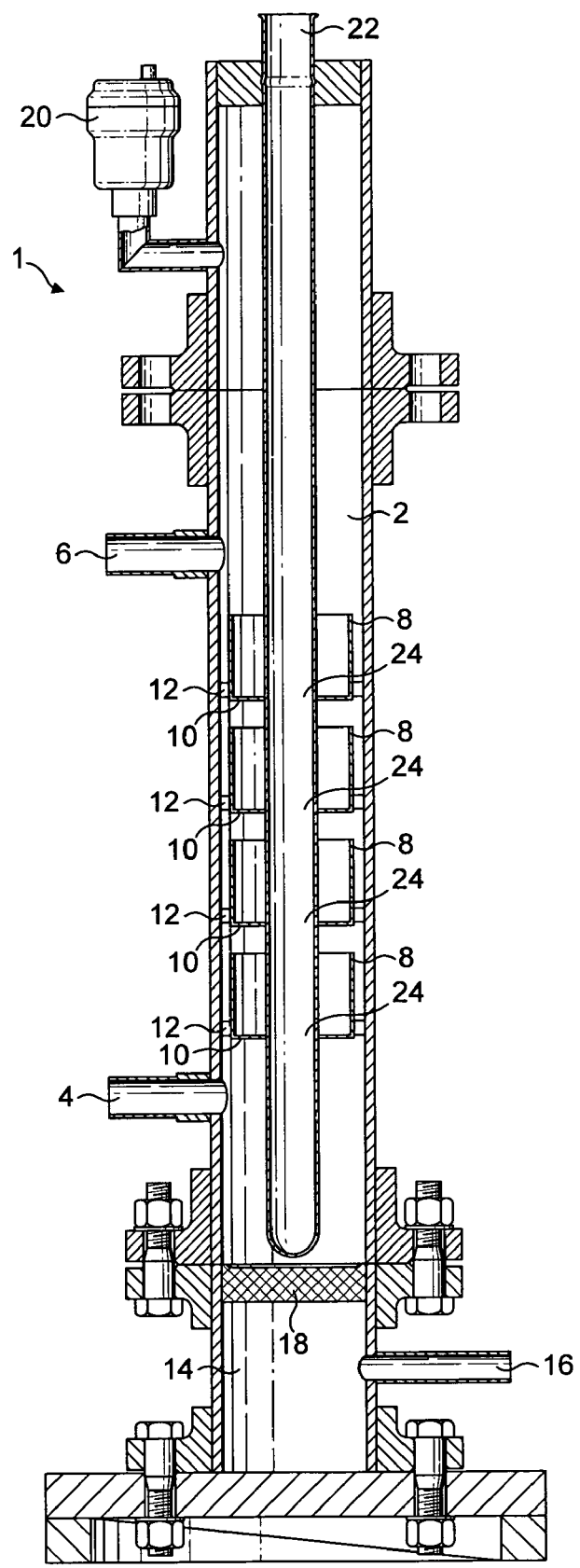
FIG. 1 is a cross-section through a first embodiment of a photocatalytic reactor.

Referring to FIG. 1, a photocatalytic reactor 1 includes a flow-through reaction chamber 2 for treating waste water including organic contaminants. Water which is to be treated enters the reaction chamber through a water inlet 4, rises through the reaction chamber and exits the reaction chamber through a water outlet 6. Within the reaction chamber there are located a plurality of open-topped baskets 8 which are made from steel and have foraminated bases 10 (functioning as the foraminated members) with 3 mm holes. Rubber gaskets 12 form an air tight seal between the outsides of the baskets and the outer wall such that liquid and air must pass through the foraminated bases.

Air is introduced into an aeration volume 14 at the bottom of the reaction chamber, below the water inlet, through an air inlet 16 from which it passes through an aeration matrix 18 (which together with the air inlet and aeration volume functions as an aeration device) in the form of a fine mesh which produces 1 mm diameter air bubbles which rise through the reaction chamber. Air bubbles rise through the foraminated members and excess air is removed using an air bleed valve 20 at the top of the reaction chamber, above the water outlet.

A UV emitting fluorescent tube (not shown) is located within a glass tube 22 which passes through apertures 24 in the foraminated bases. The apertures are sealed around the glass tube in an air and water-tight fashion to ensure that air bubbles and water pass only through the holes of the foraminated bases.

In use, anatase phase titanium dioxide pellets (not shown), which function as the plurality of photocatalyst particles, are loaded into each basket and rest on the foraminated bases. In this example, the titanium dioxide pellets are moulded from titanium powder and are cylindrical with a diameter of 4 mm and lengths which vary from 2-3 mm up to around 10 mm. The titanium dioxide pellets are prepared by the process disclosed in U.S. Pat. No. 6,620,243 and European Patent EP 1,175,259 (Bernd et al.), the disclosures of which are incorporated herein by reference.

Briefly, such pellets, which are composed of primary crystallites of anatase phase titanium dioxide with a crystallite size according to the Scherrer formula of up to 40 nm and which have a specific surface area determined according to the BET method of 20 to 150 m$^2$/g, a pore volume of 0.1 to 0.45 cm$^3$/g, and a pore diameter of 100 to 300 Å, can be prepared in the form of moulded bodies with mean grain sizes d$_{50}$ ranging from 0.1 to 50 mm by a procedure in which titanium dioxide powder is pre-processed at a temperature of 120° C. to 250° C. at a pressure of 2 to 40 bar for 0.1 to 30 hours in the presence of water before being dried. Moulded bodies are then produced from a paste-like mixture of titanium dioxide powder which has been pre-treated in this way and titanium dioxide sol and/or nitric acid of from 1 to 20% concentration, which are dried and annealed at a temperature of 400 to 1000° C. for from 0.5 to 3.5 hours.

The titanium dioxide pellets rest on the foraminated base but are mobile and, over time, are agitated by the air bubbles which rise through the foraminated base. They have a terminal settling velocity which is higher than the velocity of the liquid upwards through the foraminated base and so will not be carried away with the liquid. The titanium dioxide pellets have sufficient size and density that they do not pass out of the tops of the baskets.

Some of the air bubbles may pass straight through the holes in the foraminated bases without interacting with other air bubbles. However, some of the 1 mm air bubbles created by air passing through the fine mesh gather underneath the foraminated bases. Some of these bubbles combine with each other. Thus, the bubbles which rise from the foraminated member and the photocatalyst pellets resting on the foraminated base have a diameter of 1 mm up to around 5 to 10 mm. We have found that these occasional large diameter bubbles help the agitation process. The air bubbles then rise further to the foraminated base of the basket above where, again, some may combine.

In use, the UV fluorescent tubes and air supply are switched on and water is passed through the chamber from the inlet to the outlet, with a residency time in the chamber of around 10 minutes. For a small pilot reactor of 1.5 litre volume this would give a flow rate of 150 ml/minute, however the reactor can be readily scaled up to process 100 litres/min, 1,000 litres/min, 10,000 litres per min or more. In an example, the velocity of upwards flow of liquid through the foraminated bases is 0.002-0.0025 ms$^{-1}$ and the terminal settling velocity of the titanium dioxide pellets is around 0.4 ms$^{-1}$, however the velocity of upwards flow of liquid could be higher or lower. UV light with a frequency of up to 388 nm is absorbed by the titanium dioxide leading to the formation of electron-hole pairs and chemical reactions which break down organic molecules within the water.

Example 2

Figure 2:
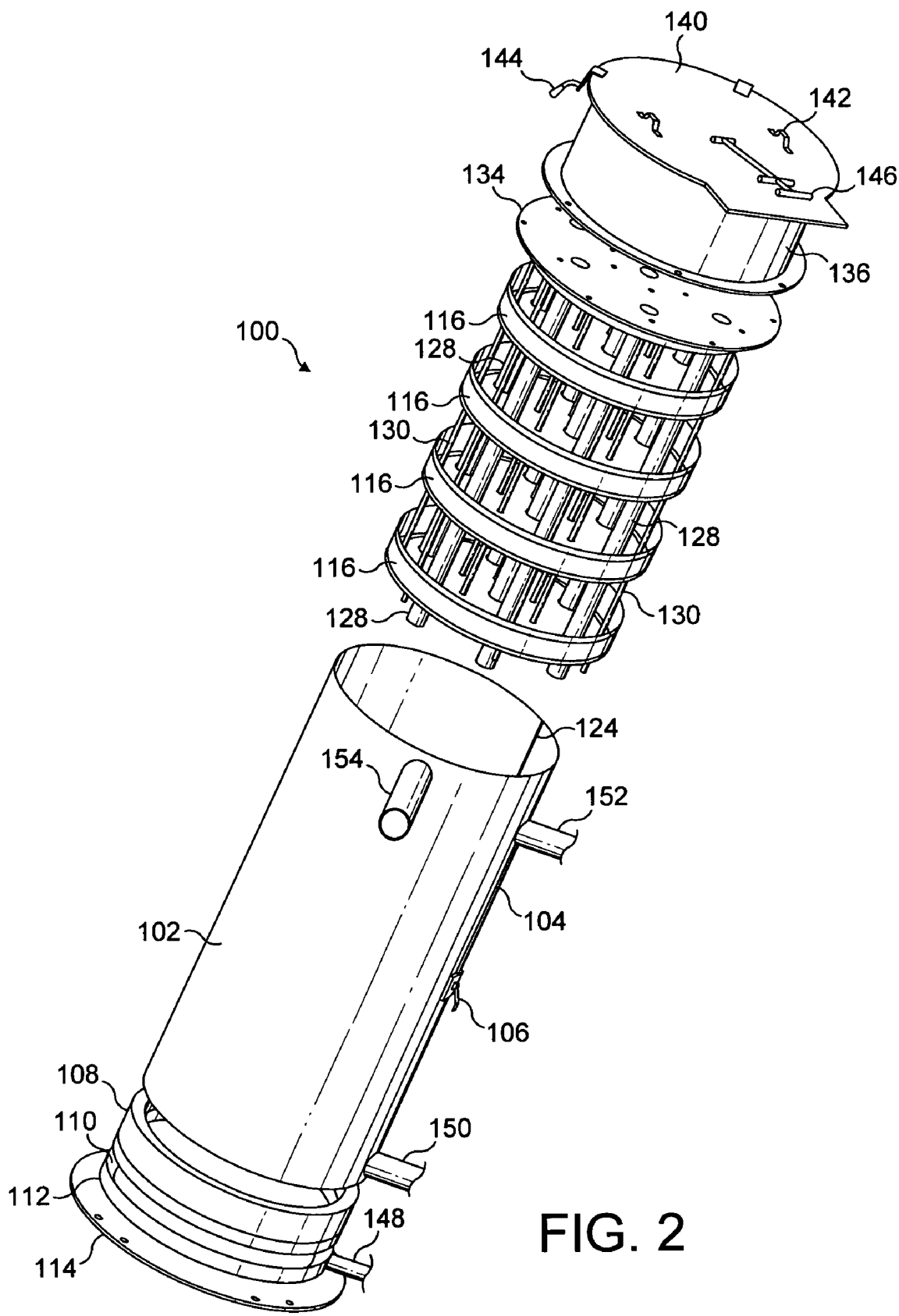
FIG. 2 is an exploded perspective view of a second embodiment of a photocatalytic reactor.
Figure 3:
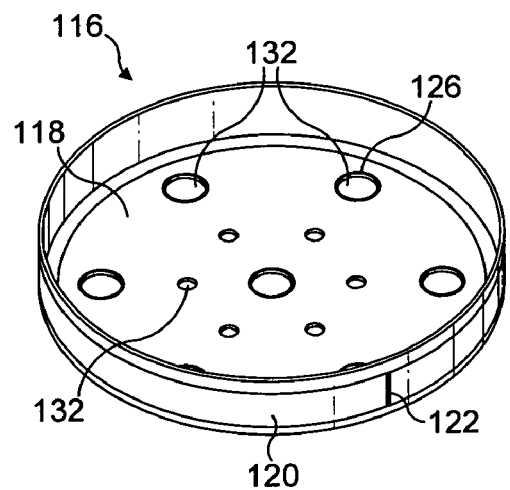
FIG. 3 is a detail of a catalyst basket.
Figure 4:
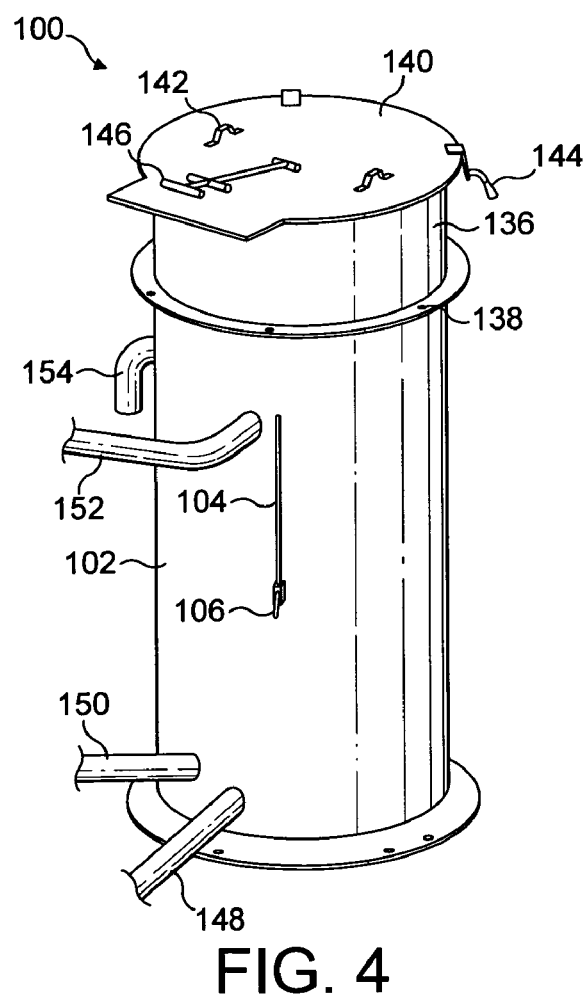
FIG. 4 is a perspective view of the second embodiment of a photocatalytic reactor once it has been assembled.

FIG. 2 is an exploded perspective view of a second embodiment of a photocatalytic reactor suitable for larger scale reactors, for example of 1,000 litre or 10,000 litre volume reactors. FIG. 3 is a detail of a catalyst basket, and FIG. 4 is a perspective view of the second embodiment of a photocatalytic reactor once it has been assembled. Referring to these Figures, a photocatalytic reactor 100 includes a reaction chamber formed by the interior of a drum 102 which has a visual level gauge 104 in the side wall thereof and an isolation valve 106 for the visual level gauge. At the base of the drum there is provided an aeration support flange 108, an aeration mesh plate 110 with a thickness of 0.8 mm and 1.0 mm diameter holes for forming air bubbles, and an aeration flange 112 below the aeration mesh plate and above a base plate 114.

A plurality of baskets 116 have foraminated stainless steel bases 118 which are 3 mm thick, with 3 mm diameter holes. The baskets have only short side walls formed by a polyurethane wear strip 120 which has a gap 122 which cooperates with an anti-torsion key 124 on the interior surface of the drum. Each foraminated stainless steel base has seven apertures which receive fluorescent UV light tubes 128 which extend through each base and which are sealed with grommets 126. The baskets are supported on twelve stud bars 130 which pass through sealed holes 132 in the base of each basket. A flange 134 at the top of the tank supports the UV tubes and stud bars. The top section of the drum 136 is attached to the drum with bolts 138 and includes a lid 140 with handles 142, clamps 144 and a support bracket 146. An air inlet 148 is provided below the aeration mesh plate. A water inlet 150 is located below the bottom basket and a water outlet 152 is provided above the top basket. An overflow pipe 154 is also provided as a precautionary measure. An air, bleed valve (not shown) is typically also provided.

As before, anatase phase titanium dioxide pellets (not shown), which function as the plurality of photocatalyst particles, are loaded into each basket and rest on the foraminated bases where they are agitated and moved by the air bubbles, some of which combine into occasional larger air bubbles beneath the foraminated members. The agitation and movement of the pellets means that the absorption of UV light by the particles is greater than would be the case for a packed column, enhancing the effectiveness of the photocatalytic process.

In each example, the foraminated members and surrounding seals divide the reaction chamber into a plurality of separate spaces. The overall catalytic efficiency is greater than if all of the catalyst rested on a single foraminated member as the catalyst pellets at the base would not be agitated to the same extent. Because of the seals around the baskets, water and air bubbles must pass through the foraminated bases of each basket.

As an alternative to the use of a fine mesh, the aeration device may be a foraminated air pipe. Alternatively, a Venturi effect aerator may be used to generate fine bubbles. The use of an aeration device to create air bubbles not only agitates the catalyst pellets, but increases the oxygen content of the liquid which is to be treated, increasing the photocatalysed reduction of oxygen to superoxide anions and thus the efficiency of the remediation process. The air bubbles mix into the water flowing through the inlet in the space below the lowest basket Because the photocatalytic reactor does not include moving parts, it can have a long operational lifetime and be suitable for use in locations, such as offshore installations, where maintenance may be difficult. The total power consumption may also be less than in a reactor including moving parts.

Further modifications and variations may be made within the scope of the invention herein disclosed.

The invention claimed is:

1. A photocatalytic reactor for carrying out a photocatalytic reaction on an aqueous liquid which is to be treated, the reactor comprising (i) a reaction chamber which is divided by a plurality of foraminated members into a plurality of separate spaces, each space having a base which comprises one of the foraminated members which supports a plurality of mobile photocatalyst particles, the size and density of the particles is such that they tend to rest on the foraminated members while the aqueous liquid is being treated; and (ii) an aeration device located below plurality of foraminated members which causes gas bubbles to rise through the aqueous liquid which is being treated, through the foraminated members, and from each of the foraminated members so as to agitate and move the plurality of mobile photocatalyst particles resting on each foraminated member.

2. A photocatalytic reactor according to claim 1, wherein a terminal settling velocity of the photocatalyst particles exceeds a velocity of any upwards flow of the aqueous liquid through the foraminated member by at least 0.1 ms$^{-1}$.

3. A photocatalytic reactor according to claim 2, wherein the photocatalytic reactor is a flow-through reactor and the aqueous liquid which is to be treated flows upwards through the foraminated members.

4. A photocatalytic reactor according to claim 3, wherein the reaction chamber comprises an inlet for receiving the aqueous liquid which is to be treated and an outlet, wherein the outlet is located above the inlet and the aqueous liquid flows generally upwards from the inlet to the outlet through the foraminated members.

5. A photocatalytic reactor according to claim 1, wherein the gas bubbles comprise a gas which is a substrate for a reaction catalysed by the photocatalyst particles.

6. A photocatalytic reactor according to claim 1, wherein at least some of the gas bubbles which rise from the foraminated members and photocatalyst particles in contact with the foraminated member have a diameter which is at least double the maximum diameter of the gas bubbles which rise through the aqueous liquid which is to be treated to the foraminated members.

7. A photocatalytic reactor according to claim 1, wherein the foraminated members comprise holes with a width of at least 0.3 mm.

8. A photocatalytic reactor according to claim 1, wherein the reaction chamber comprises a light source which emits light that is received by the photocatalyst particles and is of a catalytic frequency.

9. A photocatalytic reactor according to claim 1, wherein each foraminated member comprises an aperture through which a light source extends.

10. A photocatalytic reactor according to claim 1, wherein the photocatalyst particles comprise titanium dioxide.

11. A photocatalytic reactor according to claim 10, wherein the aqueous liquid which is to be treated is water which is to be treated to remove organic pollutants.

12. A photocatalytic reactor according to claim 1, wherein a minor dimension of the photocatalyst is at least 0.5 mm and not more than 10 mm.

13. A photocatalytic reactor according to claim 1, wherein the reaction chamber comprises a plurality of baskets, and each basket has one of the bases which comprises one of said foraminated members.

* * * * *